April 7, 1953     F. L. LAVASH     2,633,949
OVERRUNNING CLUTCH
Filed June 17, 1948
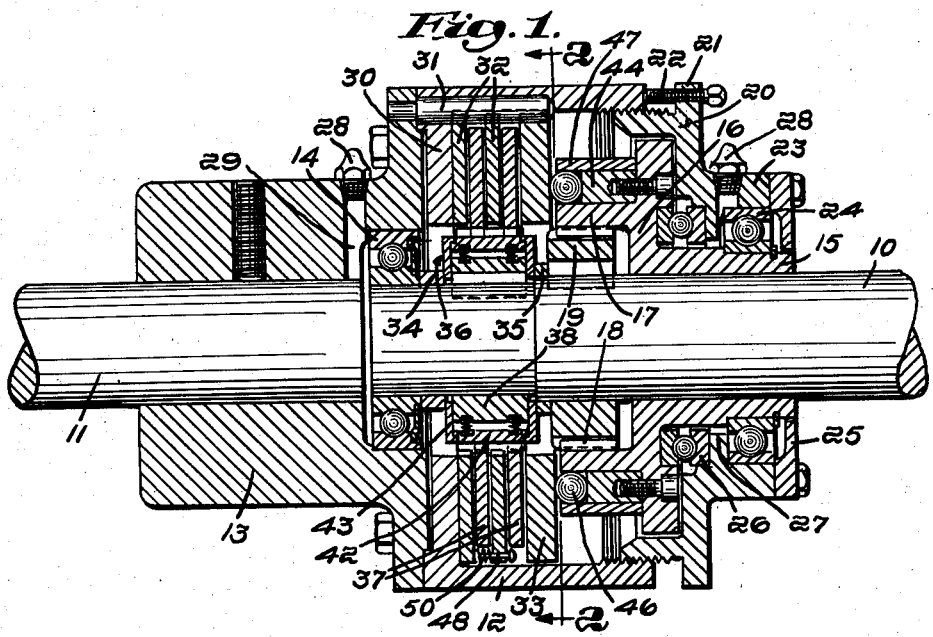
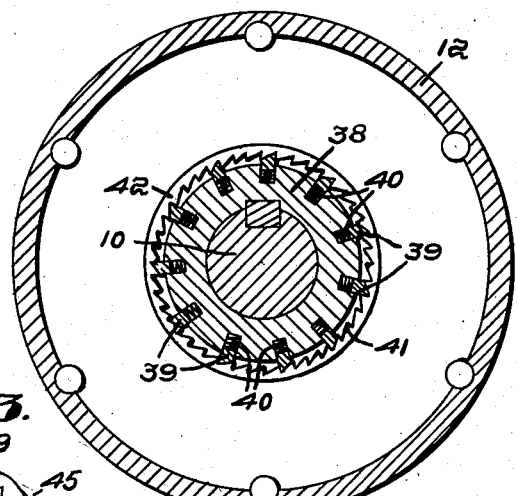
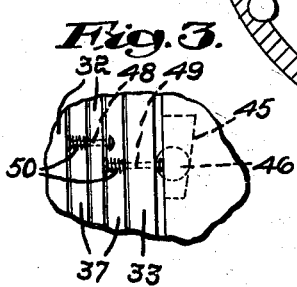
Inventor:
Francis L. Lavash,
by Spear & Spear
Attorneys Patented Apr. 7, 1953

2,633,949

UNITED STATES PATENT OFFICE 2,633,949

OVERRUNNING CLUTCH

Francis L. Lavash, Dedham, Mass., assignor, by mesne assignments, to Newton Clutch Company, West Newton, Mass., a partnership Application June 17, 1948, Serial No. 33,550

4 Claims. (Cl. 192—35)

My present invention relates to overrunning clutches and particularly to such clutches in which the shaft coupling means are rendered operative or inoperative by actuating means responsive to rotation of the shafts relative to each other.

In overrunning clutches with which I am familiar, where the means responsive to partial rotation of the shafts relative to each other is the only coupling between the shafts, operation is unsatisfactory because it is difficult to ensure the uncoupling of the shafts when the driven shaft tends to rotate faster than the drive shaft due to the fact that deformation of certain of the parts results in the driving and driven elements being wedged together. Where it has been proposed to utilize such means to actuate a disc clutch, for example, it is impossible to effect disengagement of the disc clutch since, when engaged, it prevents relative rotation between the shafts.

In accordance with my invention, I provide an overrrunning clutch in which the means to couple the drive and driven shafts includes an actuating member rotatable with the driven shaft and a driving member connected to the drive shaft to rotate at least partially relative thereto when the driven shaft tends to overrun. Keyed to the drive shaft and working against the actuating member are thrust means operable on rotation of the shafts relative to each other to effect engagement or disengagement of the clutch. Because, when the clutch is engaged, relative movement is provided between the driving clutch element and the drive shaft, the clutch actuating member is rotated positively relative to the thrust means, when the driven shaft overruns, ensuring that the thrust means are rendered inoperable to maintain clutch engagement.

In the accompanying drawings, I have shown an illustrative embodiment of my invention from which these and other of its novel features and advantages will be readily apparent.

Fig. 1 is a longitudinal section through an overrunning clutch in accordance with my invention.

Fig. 2 is a section along the lines 2—2 of Fig. 1, and

Fig. 3 is a fragmentary view showing, in elevation, parts of the thrust means and of the main clutch.

In the embodiment of my invention shown in the drawings, I have indicated the drive and driven shafts at 10 and 11, respectively.

A casing 12 overlies the end of the drive shaft 10 and has a hub 13 locked on the driven shaft 11 and a bearing unit 14 supporting the end of the drive shaft 10. At 15, I have shown a hub slidably supported on the drive shaft 10 and having a flange 16 formed with an annular shoulder 17 spaced from the drive shaft 10. As a convenient means of slidably connecting the hub 15 to the shaft 10 to rotate therewith, I provide the inner surface of the shoulder 17 with teeth 18 meshing with the teeth of a gear 19 keyed to the shaft 10 thereby to establish a spline.

A head 20 is threaded into the open end of the casing 12 and has a flange 21 through which are threaded set screws 22 engageable with the end of the casing 12 to lock the head 20 in any position established to provide proper operation of the overrunning clutch. The head 20 includes a hub 23 between which and the hub 15 is a bearing unit 24 and to the exposed end of which is secured a cap 25. I also provide a thrust bearing unit 26 between the flange 16 and the shoulder 27 of the head hub 23 and provide the hubs 13 and 23 with conventional fittings 28 to ensure adequate lubrication of the bearing units through the lubricant conduits 29.

To establish a clutch to couple the shafts 10 and 11, I provide the casing 12 with a backing plate 30 and with splines 31 to slidably support the clutch discs 32 and the pressure plate 33. Suitably keyed to the drive shaft 10 and held against axial movement by spacers 34 and 35 is a unit, generally indicated at 36, which slidably supports clutch discs 37. By this structure, the shafts 10 and 11 are coupled together when the clutch discs 32 and 37 are clamped together against the backing plate 30 by the pressure plate 33.

In accordance with my invention, the unit 36 establishes a connection between the shaft 10 and the clutch discs 37 which permits at least partial rotation of the discs 37 relative thereto when the clutch is engaged and when the driven shaft 11 tends to rotate in the same direction but faster than the drive shaft 10. While such a connection may be variously accomplished, the unit 36 may conveniently be of the ratchet type and consist of a member 38 keyed to the shaft 10 and having a plurality of radial pockets in each of which is slidably mounted a pawl 39 yieldably urged outwardly by springs 40 to engage with teeth 41 on the inner edge 42 of each of the clutch discs 37 thereby to slidably support them. To the ends of the member 38 are attached keepers 43 for the pawls 39.

In the embodiment of my invention shown in the drawings, the means effecting engagement or disengagement of the main clutch consist of a ring 44 bolted to the flange 16 and formed with a plurality of pockets 45 disposed towards the pressure plate 33. As will be apparent from Fig. 3, each pocket 45 is of sufficient depth at its leading end to house a ball 46 therein held in starting position by light contact with the pressure plate 33 and decreases in depth towards its trailing end so that as the shaft 10 tends to rotate relative to the driven shaft 11, the balls 46 move towards the trailing ends of their pockets 45 and exert pressure against the pressure plate 33 thrusting it towards the backing plate 30 so that the clutch discs are clamped together thereagainst. The balls 46 are retained in their pockets by the annular shoulder 17 and the retaining sleeve 47.

The thrust means just described may be otherwise formed to effect clutch engaging or disengaging action. The thrust means shown in the drawings is, however, preferred since the effect of centrifugal force on the balls 46 is eliminated by having their path in parallel with the axis of the shafts.

In practice, I provide pins 48 adjacent the periphery of one of the clutch discs 32 extending freely through the other disc 32 which also has suitably disposed pins 49 extending freely through the pressure plate 33. The pins 48 and 49 serve to support compression springs 50 yieldably urging the discs 32 and the plate 33 into spaced relationship when the clamping pressure on the plate 33 is released.

In operation, when the drive shaft 10 is to rotate the driven shaft 11, the carrier for the balls 46 that is established by the shoulder 17, the ring 44 and the sleeve 47 rotates relative to the driven shaft 11. On such rotation relative to the pressure plate 33, the balls 46 travel in their pockets 45 and in such travel exert such pressure on the pressure plate 33 as to effect clutch engagement to couple the shafts 10 and 11 together.

During this phase of operation of my overrunning clutch, the unit 36 may be regarded simply as a spline support for the clutch discs 37. When the driven shaft 11 tends to overrun, however, the unit 36 is effective to render the clutch operable as an overrunning clutch.

Were the clutch discs 37 so connected to the drive shaft 10 that no relative rotary motion therebetween was possible, the tendency of the driven shaft 11 to overrun would not be accompanied by disengagement of the clutch discs because the balls 46 remain wedged in their clutch engaging position and it requires, in practice, considerable force to dislodge them to effect clutch disengagement for it will be appreciated that the clutch plates 32 and 37 are clamped together under substantial pressure.

My invention provides, in the unit 36, means enabling the locked clutch plates and the pressure plate 33 to rotate as a unit relative to the shaft 10 when the driven shaft tends to overrun. In practice, only slight partial rotation is required to effect clutch disengagement as it is only necessary to start the balls 46 from their locked position that results when the drive shaft 10 picks up the load.

In accordance with my invention, I am thus able to provide an overrunning clutch in which adequate thrust is developed to ensure the proper clutch engagement without the thrust means carrying any load in excess of that required to develop the necessary clamping pressure on the clutch discs to carry the driven shaft load. In this connection, it may be noted that the fact that the clamping pressure on the clutch discs is in proportion to the driven shaft load also ensures a gradual pickup of the driven shaft from a position of rest. My invention makes possible the use of this combination in a reliably operating overrunning clutch since any difficulty in releasing the balls 46 when the driven shaft tends to overrun is eliminated. This results because the connection between the clutch plates 37 and the drive shaft 10 and the thrust bearing unit 26 between the flange 16 and the head 20 enables the driven shaft 11 to rotate relative to the shaft 10 sufficiently to advance the balls 46 positively in their pockets thereby to ensure the release of the clamping pressure on the clutch.

What I therefore claim and desire to secure by Letters Patent is:

1. An overrunning clutch comprising a first element, a second element, one of said elements being the driving element and the other of said elements being the driven element, a clutch to couple said elements, said clutch including a backing member rotatable with said first element, a clutch plate, a connection between said plate and said second element slidably supporting said plate, said connection including a plurality of pairs of shoulders engageable except when the driven element tends to overrun and enabling said plate then to rotate at least partially relative to said second element and thrust means operable to cause said plate and said backing member to rotate together as a unit, said thrust means including a first part rotatable with said second element, a second part rotatable with but slidable relative to said backing member, one of said parts constituting a driving part and the other of said parts constituting the driven part and a plurality of rotatable members, the driving part having cam pockets for said rotatable members, said parts being so located relative to each other that the driven part retains said rotatable members in said pockets and said second part is moved axially thereby as said driving part rotates relative to the driven part to cam said rotatable members into a position in which they are jammed between and connect said parts, said connection enabling said second part to rotate with said clutch plate when said driven element tends to overrun so that said jammed rotatable members constitute the sole connection between said elements thereby providing for the positive rotation of said driven part against the drag of said driving part to rotate said rotatable members to release them from their jammed position.

2. An overrunning clutch comprising a first element, a second element, one of said elements being the driving element and the other of said elements being the driven element, a clutch to couple said elements, said clutch including a backing member rotatable with said first element, a clutch plate, a ratchet connection between said plate and said second element slidably supporting said plate, and enabling said plate then to rotate at least partially relative to said second element and thrust means operable to cause said plate and said backing member to rotate together as a unit, said thrust means including a first part rotatable with said second element, a second part rotatable with but slidable relative to said backing member, one of said parts constituting a driving part and the other of said parts constituting the driven part and a plurality of rotatable members, the driving part having cam pockets for said rotatable members, said parts being so located relative to each other that the driven part retains said rotatable members in said pockets and said second part is moved axially thereby as said driving part rotates relative to the driven part to cam said rotatable members into a position in which they are jammed between and connect said parts, said connection enabling said second part to rotate with said clutch plate when said driven element tends to overrun so that said jammed rotatable members constitute the sole connection between said elements thereby providing for the positive rotation of said driven part against the drag of said driving part to rotate said rotatable members to release them from their jammed position.

3. In an overrunning clutch, the combination of a rotary driving element, a co-axial rotary driven element, a plate type friction clutch having a driven part connected with said driven element and having a driving part and also a thrust plate shiftable to engage said friction clutch; a one-way driving connection between said driving element and said driving part so arranged as to permit at least limited overrunning rotation of said driving part relatively to said driving element, means affording coactive thrust surfaces turning with said driving element, and roller clutch members interposed between said thrust surfaces and said thrust plate, the parts being so arranged that driving torque between the driving and driven elements causes the roller clutch members to force the thrust plate in the direction to engage the friction clutch, said one-way driving connection serving to permit overrunning rotation of the driven element while the friction clutch is engaged, whereby said thrust plate is rotated with said driven element to forcibly disengage said roller clutch members against the drag of said driving element on said thrust surfaces and so release the friction clutch.

4. In an overrunning clutch, the combination of a rotary driving element, a co-axial rotary driven element, a plate type friction clutch having a driven part connected with said driven element and having a driving part and also a thrust plate shiftable to engage said friction clutch, a one-way driving connection between said driving element and said driving part so arranged as to permit at least limited overrunning rotation of said driving part relatively to said driving element; means affording coactive thrust surfaces turning with said driving element; and roller clutch members interposed between said thrust surfaces and said thrust plate, the parts being so arranged and proportioned that driving torque developed between the driving and driven elements causes the roller clutch members to force the thrust plate in the direction to engage the friction clutch and at the same time assume substantially the portion of the driving torque between the driving and driven elements that is required to transmit the required plate pressure to meet existing torque requirements, said one-way driving connection serving to permit overrunning rotation of the driven element while the friction clutch is still engaged whereby said thrust plate is rotated with said driven element to forcibly disengage said roller clutch members against the drag of said driving element on said thrust surfaces and so release the friction clutch.

FRANCIS L. LAVASH.

REFERENCES CITED

The following references are of record in the file of this patent:

UNITED STATES PATENTS

| Number | Name | Date |
|---|---|---|
| 1,531,825 | Webb | Mar. 31, 1925 |
| 1,974,390 | Eason | Sept. 18, 1934 |
| 2,023,197 | Fishburn | Dec. 3, 1935 |
| 2,091,270 | Colman | Aug. 31, 1937 |
| 2,226,309 | Gleasman | Dec. 24, 1940 |
| 2,241,242 | Friedman | May 6, 1941 |